(12) United States Patent
Weiler et al.

(10) Patent No.: US 10,793,113 B2
(45) Date of Patent: Oct. 6, 2020

(54) WINDSHIELD WIPER DEVICE

(71) Applicant: Robert Bosch GmbH, Stuttgart (DE)

(72) Inventors: Michael Weiler, Buehl (DE); Peter Deak, Budapest (HU); Adel Lisztik-Madar, Szalka (HU); Nikoletta Zsoldosne Sverha, Budapest (HU); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 15/036,164

(22) PCT Filed: Oct. 31, 2014

(86) PCT No.: PCT/EP2014/073449
§ 371 (c)(1),
(2) Date: May 12, 2016

(87) PCT Pub. No.: WO2015/071117
PCT Pub. Date: May 21, 2015

(65) Prior Publication Data
US 2016/0297404 A1 Oct. 13, 2016

(30) Foreign Application Priority Data
Nov. 12, 2013 (DE) .......................... 10 2013 222 992

(51) Int. Cl.
*B60S 1/34* (2006.01)
*B60S 1/38* (2006.01)
*B60S 1/52* (2006.01)

(52) U.S. Cl.
CPC ............. *B60S 1/3459* (2013.01); *B60S 1/345* (2013.01); *B60S 1/3436* (2013.01);
(Continued)

(58) Field of Classification Search
CPC ...... B60S 1/34; B60S 1/38; B60S 1/52; B60S 1/3459; B60S 1/3801; B60S 1/3436
(Continued)

(56) References Cited

U.S. PATENT DOCUMENTS 3,082,026 A    3/1963   Anderson
4,566,146 A *  1/1986   Harbison .............. B60S 1/3459
                                                 15/250.34

(Continued)

FOREIGN PATENT DOCUMENTS

CN        1255900 A      6/2000
CN       102427973 A     4/2012
(Continued)

OTHER PUBLICATIONS

International Search Report for Application No. PCT/EP2014/073449 dated Jan. 21, 2015 (English Translation, 3 pages).

*Primary Examiner* — Monica S Carter
*Assistant Examiner* — Katina N. Henson
(74) *Attorney, Agent, or Firm* — Michael Best & Friedrich LLP (57) ABSTRACT

The invention relates to a windshield wiper device (100) for a vehicle, comprising a wiper blade (2) having an elongated upper part (10) and an elongated lower part (12), which are configured to be flexible, at least in part. Furthermore, the device comprises a plurality of connecting elements (18) for connecting the upper part (10) and the lower part (12), which are spaced apart from each other along a longitudinal
(Continued)

extension (8) of the wiper blade (2), and which are configured to allow a movement of the upper part (10) and the lower part relative to one another with a motion component along a longitudinal extension (8) of the wiper blade (2). The windshield wiper device (100) further comprises a fastening device. The fastening device comprises a fastening part (20) on the wiper-blade side, and a fastening element (50). The fastening part (20) on the wiper-blade side, and the fastening element (50) are configured such that by means of a rotation of the fastening part (20) on the wiper-blade side relative to the fastening element (50), an engagement can be formed in order to connect the fastening part (20) on the wiper-blade side to the fastening element (50), wherein the connection can be released by means of a release mechanism.

11 Claims, 5 Drawing Sheets

(52) U.S. Cl.
CPC ............... *B60S 1/3801* (2013.01); *B60S 1/34* (2013.01); *B60S 1/38* (2013.01); *B60S 1/52* (2013.01)

(58) Field of Classification Search
USPC ........................................ 15/250.351, 250.31
See application file for complete search history.

(56) References Cited

U.S. PATENT DOCUMENTS

| | | | |
|---|---|---|---|
| 4,637,091 A | | 1/1987 | Wu |
| 5,423,106 A | | 6/1995 | Peyret |
| 8,584,303 B2 * | | 11/2013 | Wolfgarten ........... B60S 1/3409 |
| | | | 15/250.23 |
| 2009/0025171 A1 * | | 1/2009 | Cerdan ..................... B60S 1/32 |
| | | | 15/250.31 |

FOREIGN PATENT DOCUMENTS

| | | | | |
|---|---|---|---|---|
| DE | 19754449 A1 * | 5/1999 | ................ | B60S 1/38 |
| EP | 1322507 A1 | 7/2003 | | |
| FR | 2526382 A1 | 11/1983 | | |
| FR | 2841516 A1 | 1/2004 | | |
| FR | 2899875 A1 * | 4/2006 | ................ | B60S 1/34 |
| FR | 2899857 | 10/2007 | | |
| GB | 791420 A | 3/1958 | | |
| JP | H03112439 U | 11/1991 | | |
| JP | 0542020 | 6/1993 | | |
| JP | H05319215 A | 12/1993 | | |
| JP | 2009090802 | 4/2009 | | |
| JP | 2010083262 A | 4/2010 | | |
| KR | 20070108125 A | 11/2007 | | |
| WO | WO-2011131245 A1 * | 10/2011 | ............ | B60S 1/3436 |
| WO | WO 2014023702 A1 * | 2/2014 | ............ | B60S 1/3415 |
| WO | 2014072186 A1 | 5/2014 | | |

* cited by examiner

WINDSHIELD WIPER DEVICE

BACKGROUND OF THE INVENTION

The invention relates to a windshield wiper device for a vehicle, in particular a motor vehicle.

Windshield wiper devices typically have a wiper arm or wiper lever, wherein a wiper blade is moved on the windshield of a motor vehicle. Here, the wiper blade is moved between a first reversal point and a second reversal point. For this purpose, the wiper arm is connected by way of a drive shaft to a wiper motor. In particular on windshields with intense changes in curvature, the wiper blade easily loses contact with the windshield. This can give rise, in particular in the case of intensely curved windshields, to non-wiped wiping areas, and/or to smearing.

Since a wiping process must be optimized with regard to a multiplicity of parameters, such as for example an amount of rain falling on the windshield, a possible snow load on the windshield, the speed of the vehicle and associated wind pressure on the wiper arm, smearing cannot be reliably prevented simply by adapting the pressure of the wiper arm on the windshield. It is therefore a requirement to further improve windshield wiper devices.

For the improvement, there is a multiplicity of boundary conditions that must additionally be taken into consideration. Said boundary conditions include the outlay for production or the production costs, the material costs, but also the characteristics of the windshield wiper device, in particular the function under a variety of conditions, and the durability under a multiplicity of conditions.

Normally, in the case of windshield wiper devices, in particular in the case of wiper blades, wear phenomena occur as a result of the regular use thereof, which wear phenomena are associated with a deterioration in wiping quality. Furthermore, owing to the exposed position of windshield wiper devices on the front or rear windshield of motor vehicles, in particular when traveling through a car washing installation, there is the risk of the windshield wiper device being damaged or even torn off. In these cases, it is necessary to exchange the worn or damaged windshield wiper devices. The exchange of windshield wiper devices is traditionally relatively cumbersome, because they are normally fastened to the drive shaft by way of screw connections.

SUMMARY OF THE INVENTION

It is the object of the present invention to provide a windshield wiper device with which at least one or more of the abovementioned disadvantages are alleviated or substantially do not arise.

According to one aspect of the present invention, a windshield wiper device for a vehicle having a fastening element, in particular a motor vehicle, is proposed. The windshield wiper device comprises a wiper blade having an elongate upper part and an elongate lower part, which are at least partially of flexible form. Furthermore, multiple connecting elements for connecting the upper part and the lower part are provided, wherein the connecting elements are spaced apart from one another along a longitudinal extent of the wiper blade. The connecting elements are designed to permit a movement of the upper part and of the lower part relative to one another with a movement component along a longitudinal extent of the wiper blade. Furthermore, the wiper blade comprises a wiper blade-side fastening part. The wiper blade-side fastening part is configured such that, by way of a rotation of the wiper blade-side fastening part relative to the fastening element, an engagement action can be realized in order to connect the wiper blade-side fastening part to the fastening element, wherein the connection can be released by way of a release mechanism. The release mechanism is arranged on the wiper blade-side fastening part.

According to another aspect of the present invention, a windshield wiper device for a vehicle, in particular a motor vehicle, is proposed. The windshield wiper device comprises a fastening element, which can be installed on the vehicle, and a wiper blade. The wiper blade comprises an elongate upper part and an elongate lower part, which are at least partially of flexible form. Furthermore, multiple connecting elements for connecting the upper part and the lower part are provided, wherein the connecting elements are spaced apart from one another along a longitudinal extent of the wiper blade. The connecting elements are designed to permit a movement of the upper part and of the lower part relative to one another with a movement component along a longitudinal extent of the wiper blade. Furthermore, the wiper blade comprises a wiper blade-side fastening part. The wiper blade-side fastening part is configured such that, by way of a rotation of the wiper blade-side fastening part relative to the fastening element, an engagement action can be realized in order to connect the wiper blade-side fastening part to the fastening element, wherein the connection can be released by way of a release mechanism. The release mechanism is arranged on the fastening element.

According to a further aspect of the present invention, a method for the installation of a windshield wiper device is provided. The method comprises providing a windshield wiper device as per the embodiments described herein. The method furthermore comprises fastening the wiper blade-side fastening part to the fastening element by realization of an engagement action between the wiper blade-side fastening part and the fastening element. Here, the wiper blade-side fastening part is rotated relative to the fastening element about an axis of rotation which runs substantially transversely with respect to the longitudinal extent of the wiper blade.

Preferred embodiments and special aspects of the invention will emerge from the dependent claims, from the drawings and from the present description.

With the windshield wiper device described herein according to embodiments described herein, and by way of the method for the installation of the windshield wiper device, a windshield wiper device is provided which can be installed and uninstalled in a simple manner. The windshield wiper device, which is preferably of fin-ray type, is, with the aid of a release mechanism, installed in rotational fashion onto a bearing shaft and uninstalled therefrom in rotational fashion. Accordingly, in the event of damage, the windshield wiper device can be easily exchanged or can be easily removed before traveling through a car washing installation, and subsequently installed again. Furthermore, the rotational installation and uninstallation has the advantage that the elements to be joined do not become jammed, such as may arise for example in the case of an axially parallel joining action.

In embodiments of the disclosure that may be combined with other embodiments described herein, the release mechanism is arranged on the wiper blade-side fastening part. Thus, for example in the event of a defect of the release mechanism, simple and inexpensive repair is made possible, because only the wiper blade has to be exchanged, and not the fastening element that is fixedly installed on the vehicle.

In embodiments of the disclosure that may be combined with other embodiments described herein, the release mechanism is arranged on the fastening element. The wiper blade can thus be produced easily and inexpensively.

In embodiments of the disclosure that may be combined with other embodiments described herein, the wiper blade-side fastening part comprises a cutout through which the release mechanism can be actuated. In particular if the release mechanism is arranged on the fastening element, the wiper blade can be produced easily and inexpensively without additional parts.

In embodiments of the disclosure that may be combined with other embodiments described herein, the release mechanism comprises a mechanically actuable pushbutton. A user can thus install and uninstall the windshield wiper device easily by pressing the pushbutton.

In embodiments of the disclosure that may be combined with other embodiments described herein, the wiper blade-side fastening part has a first engagement element which is designed to realize an engagement action with a first securing element of the fastening element. Thus, a windshield wiper device is provided with which a position of the wiper blade-side fastening part relative to the fastening element can be fixed.

In other embodiments of the disclosure that may be combined with other embodiments described herein, the fastening element has a first engagement element which is designed to realize an engagement action with a first securing element of the wiper blade-side fastening part. Thus, a windshield wiper device is provided with which a position of the wiper blade-side fastening part relative to the fastening element can be fixed.

In embodiments of the disclosure that may be combined with other embodiments described herein, the release mechanism is designed such that, upon the actuation of the release mechanism, the engagement action between the first engagement element and the first securing element is released. It is thus possible for a user to install and uninstall the wiper blade easily, for example by pressing the release mechanism.

In embodiments of the disclosure that may be combined with other embodiments described herein, the release mechanism comprises an elastic element. The release mechanism can thus, in the installed state, be held in the position in which the first engagement element is in engagement with the first securing element, whereby an inadvertent release of the connection can be prevented.

In embodiments of the disclosure that may be combined with other embodiments described herein, the wiper blade-side fastening part has a second engagement element which is designed to realize an engagement action with a second securing element of the fastening element. In this way, a windshield wiper device is provided with which a position of the wiper blade-side fastening part relative to the fastening element can be fixed in a particularly stable manner.

In embodiments of the disclosure that may be combined with other embodiments described herein, the second engagement element extends substantially transversely with respect to the longitudinal extent of the wiper blade and is preferably of pin-like form. Thus, a fastening device is provided which can be produced easily and inexpensively and with which the wiper blade-side fastening part can be fixed relative to the fastening element in a particularly stable manner.

BRIEF DESCRIPTION OF THE DRAWINGS

Exemplary embodiments of the invention are illustrated in the figures and will be described in more detail below. In the figures.

DETAILED DESCRIPTION

Below, unless stated otherwise, the same reference designations are used for identical elements and elements of identical action.

Figure 1:
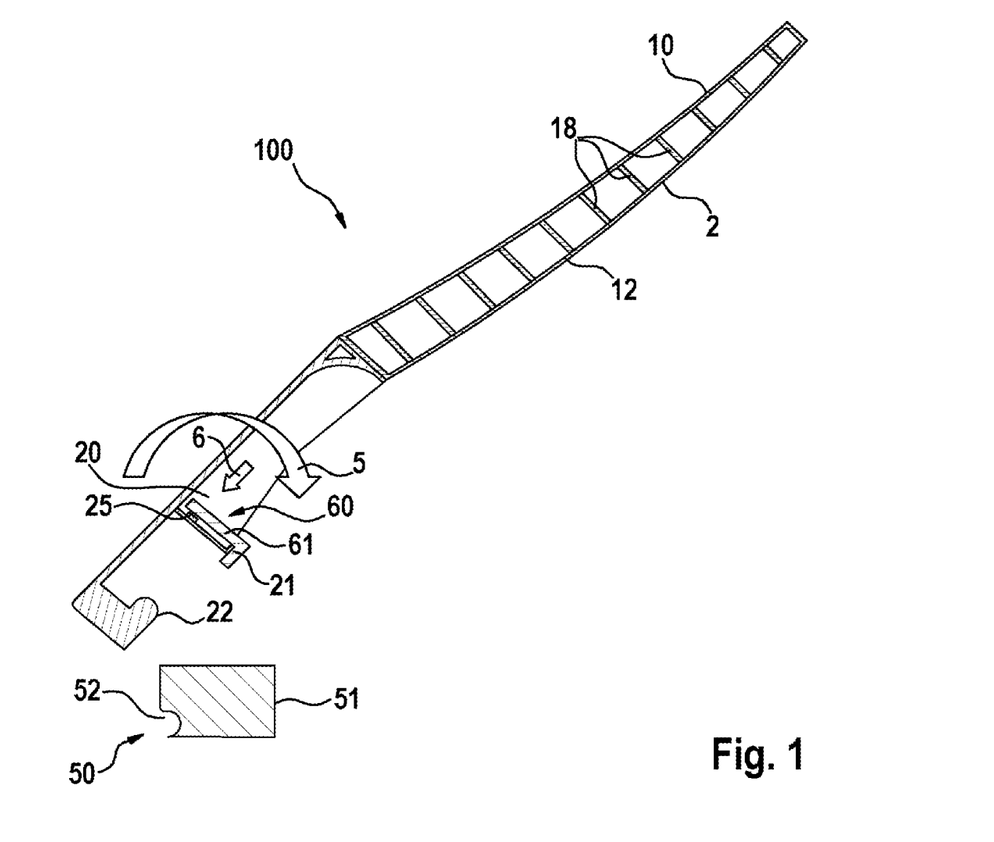
FIG. 1 is a schematic illustration of a windshield wiper device according to embodiments of the disclosure in an unfastened state.
Figure 2:
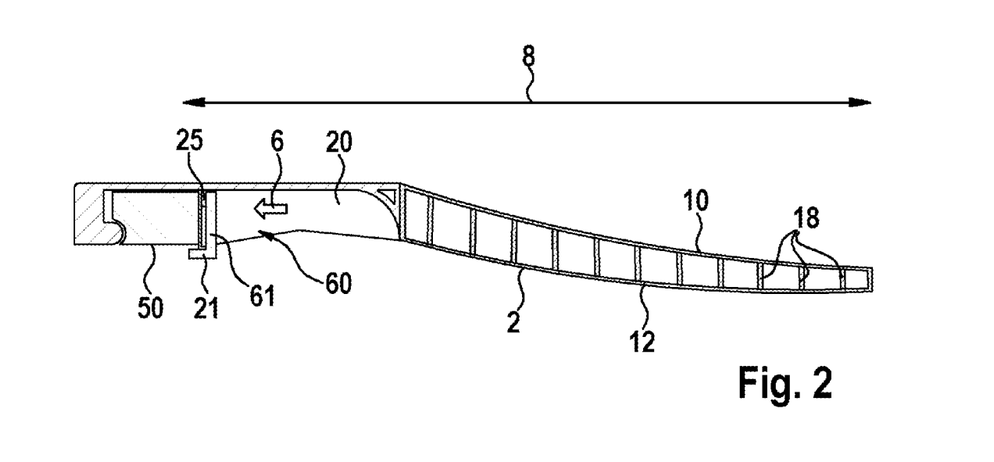
FIG. 2 is a schematic illustration of the windshield wiper device as per FIG. 1 in a fastened state.

FIGS. 1 and 2 schematically illustrate a windshield wiper device 100 according to embodiments of the disclosure. FIG. 1 shows the windshield wiper device 100 in an unfastened state, and FIG. 2 shows the windshield wiper device 100 in a fastened state.

In embodiments of the disclosure, the windshield wiper device comprises a fin-ray structure, a wiper blade-side fastening part, and a release mechanism.

In embodiments of the disclosure, the windshield wiper device 100 comprises a wiper blade 2 with an elongate upper part 10 and with an elongate lower part 12, which are at least partially of flexible form. Furthermore, multiple connecting elements 18 for connecting the upper part 10 and the lower part 12 are provided, wherein the connecting elements 18 are spaced apart from one another along a longitudinal extent 8 of the windshield wiper device 100. The connecting elements 18 are designed to permit a movement of the upper part 10 and of the lower part 12 relative to one another with a movement component along a longitudinal extent 8 of the windshield wiper device 100.

In embodiments of the disclosure that may be combined with other embodiments, the wiper blade 2 has a wiper blade-side fastening part 20 which is connectable to a fastening element 50 installed on the vehicle. The wiper blade-side fastening part 20 and the fastening element 50 are configured such that, by way of a rotation of the wiper blade-side fastening part 20 relative to the fastening element 50, an engagement action can be realized in order to connect the wiper blade-side fastening part 20 to the fastening element 50. The connection can be released by way of a release mechanism 60.

In embodiments that may be combined with other embodiments, the wiper blade-side fastening part 20 and the fastening element 50 are configured such that, by rotation of the wiper blade-side fastening part 20 relative to the fastening element 50 about an axis of rotation which runs substantially transversely with respect to the longitudinal extent 8 of the wiper blade device 100, a position of the wiper blade-side fastening part 20 relative to the fastening element 50 can be fixed. Such a rotation for the fastening of the wiper blade-side fastening part 20 to the fastening element 50 is indicated by way of example by the arrow 5 in FIG. 1.

In embodiments that may be combined with other embodiments, for the installation of the windshield wiper device 100, the latter is pressed against a windshield of the vehicle by way of a rotational movement about the axis of rotation, and engages with detent action at the working point. This may be realized either by way of a force (for example using a finger) or else, for relatively strong preloads, by way of an installation moment (for example using a hand). In the event of uninstallation, the release mechanism 60 (for example pushbutton) is actuated, and the part (wiper blade 2) is separated from the wiper drive (fastening element 50) by way of a rotational movement.

In embodiments of the disclosure that may be combined with other embodiments, for the installation of the wiper blade 2 on the fastening element 50 by way of a rotation of the wiper blade-side fastening part 20 relative to the fastening element 50, an engagement action is realized between the wiper blade-side fastening part 20 and the fastening element 50 in order to connect the wiper blade-side fastening part 20 to the fastening element 50. For uninstallation, the release mechanism 60 is actuated, whereby the connection between the wiper blade-side fastening part 20 and the fastening element 50 is released, such that the wiper blade-side fastening part 20 can be released from the fastening element 50 by way of a rotation of the wiper blade-side fastening part 20 relative to the fastening element 50 in the opposite direction to the rotation during installation.

Thus, by way of the embodiments described herein, a windshield wiper device is provided which can be installed and uninstalled in a simple manner. Accordingly, the windshield wiper device can be easily exchanged in the event of damage, or can be easily removed before traveling through a car washing installation and subsequently installed again. Furthermore, jamming of the elements to be joined, such as may arise for example in the case of axially parallel installation or joining, can be avoided. This means that, for example, the fastening part 20 can be fastened securely, and without jamming, to the fastening element 50.

In embodiments of the disclosure that may be combined with other embodiments described herein, the release mechanism 60 is arranged on the wiper blade-side fastening part 20. Thus, for example in the event of a defect of the release mechanism 60, easy and inexpensive repair is made possible, because only the wiper blade 2 has to be exchanged, and not the fastening element 50 that is fixedly installed on the vehicle.

In embodiments of the disclosure that may be combined with other embodiments, the release mechanism 60 is in the form of a mechanically actuable pushbutton. In embodiments, the release mechanism 60 can be actuated by way of a pressing action, as indicated in FIGS. 1 and 2 by the arrow 6.

As illustrated by way of example in FIGS. 1 and 2, in embodiments of the windshield wiper device 100 that may be combined with other embodiments, the wiper blade-side fastening part 20 may have a first engagement element 21. Typically, the first engagement element 21 is designed to realize an engagement action with a first securing element 51 of the fastening element 50. In embodiments described herein, the first engagement element 21 can realize an engagement action with the first securing element 51 by way of a rotation about the axis of rotation (arrow 5 in FIG. 1) which runs substantially transversely with respect to the longitudinal extent 8 of the windshield wiper device 100. In some embodiments, the first securing element 51 is formed from an edge region, a projection or a depression of the fastening element 50. This is shown by way of examples in FIGS. 3A-3C.

In embodiments of the disclosure that may be combined with other embodiments described herein, the first engagement element 21 is designed such that, upon the actuation of the release mechanism 60, the engagement action between the first engagement element 21 and the first securing element 51 is released. It is thus possible for a user to easily install and uninstall the windshield wiper device 100, for example by pressing the release mechanism 60. In some embodiments, the first engagement element 21 is connected to the release mechanism 60. In some further embodiments, the first engagement element 21 and the release mechanism 60 are formed in one piece.

In embodiments of the disclosure that may be combined with other embodiments described herein, the release mechanism 60 comprises an elastic element 25. In this way, the release mechanism 60 can be fixed in a predetermined position, for example by way of a stress imparted by the elastic element 25. In some embodiments, the predetermined position is a position in which, in the installed state, the first engagement element 21, which is connected to the release mechanism 60, is in engagement with the first securing element 51. In this way, an inadvertent release of the connection can be prevented. An actuation of the release mechanism 60 may in this case be performed counter to the elastic element 25, for example counter to the stress imparted by the elastic element 25. In embodiments of the disclosure that may be combined with other embodiments described herein, the elastic element 25 comprises a spring or an elastic material.

In embodiments of the disclosure that may be combined with other embodiments described herein, the release mechanism 60 is mounted so as to be rotatable about an axis 61 which is substantially perpendicular to the longitudinal direction 8.

In embodiments of the disclosure that may be combined with other embodiments described herein, the release mechanism 60 and the first engagement element 21 are of L-shaped form, and are in particular formed in one piece. In embodiments described herein, the first engagement element 21 is designed to realize an engagement action with an edge region, with a projection or with a depression of the fastening element 50. This is discussed in FIGS. 3A-C.

In embodiments of the windshield wiper device 100 that may be combined with other embodiments, the wiper blade-side fastening part 20 may have a second engagement element 22. The second engagement element 22 is typically designed to realize an engagement action with a second securing element 52 of the fastening element 50. In embodiments described herein, an engagement action may be realized by way of a linear movement of the second engagement element 22 of the wiper blade-side fastening part 20 relative to the second securing element 52 of the fastening element 50. Typically, the end position of the second engagement element 22, that is to say the position in which the second engagement element 22 forms a stop in the second securing element 52, defines the position of the axis of rotation about which the wiper blade-side fastening part 20 is rotated relative to the fastening element 50 during an installation or uninstallation process.

In embodiments of the windshield wiper device that may be combined with other embodiments, the second engagement element 22 may be configured so as to extend substantially transversely with respect to the longitudinal extent 8 of the windshield wiper device 100. The second engagement element 22 of the windshield wiper device 100 preferably extends at an angle of approximately 90° relative to the longitudinal extent 8. The second engagement element 22 may be of pin-shaped form. It is thus possible, with the embodiments described herein, to provide a particularly effective and stable fastening device for a windshield wiper device.

In embodiments of the windshield wiper device that may be combined with other embodiments, the second engagement element 22 may comprise a plastic or be composed of plastic. In embodiments of the windshield wiper device that may be combined with other embodiments, the second securing element 52 may comprise aluminum, zinc, a plastic, a plastic with metal insert (for example in the cone region) or a combination thereof.

Figure 3A:
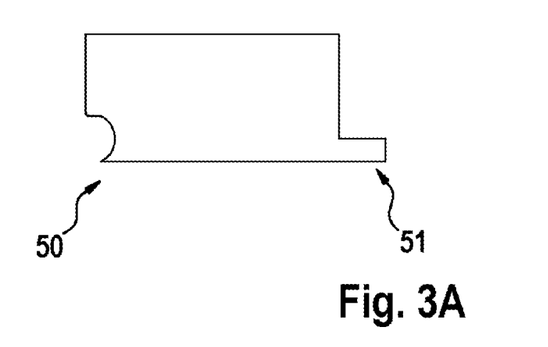
FIGS. 3A-C are schematic illustrations of fastening elements of a windshield wiper device according to embodiments of the disclosure.
Figure 3B:
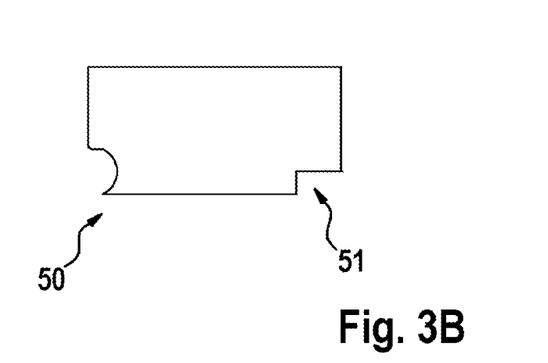
Figure 3C:
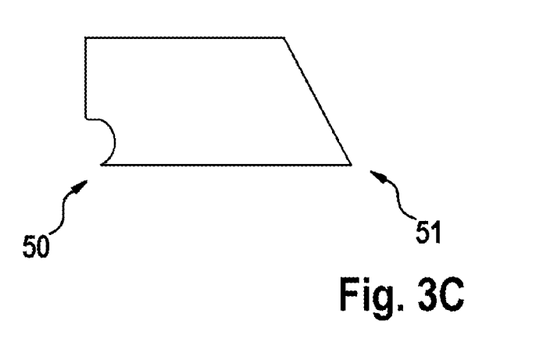

FIGS. 3A-C are schematic illustrations of fastening elements 50 according to embodiments of the disclosure. FIGS. 1 and 2 show the exemplary fastening element 50 with a substantially rectangular shape, wherein the first securing element 51 is formed by an edge of the rectangular fastening element 50, and the second securing element 52 is formed by a depression in a position situated opposite the first securing element 51. FIGS. 3A-C show further exemplary embodiments of the fastening element 50, and in particular of the first securing element 51.

In the typical embodiment shown in FIG. 3A, the first securing element 51 is formed by a projection. In the typical embodiment shown in FIG. 3B, the first securing element 51 is formed by a depression around fastening element 50.

In the typical embodiment shown in FIG. 3C, one side surface of the fastening element 50 may be beveled or flattened so as to form an angle, which may be less than 90°, with a base surface of the fastening element 50. The edge at which the flattened side surface and the base surface converge may, in typical embodiments, form the first securing element 51. Thus, during the installation of the windshield wiper device 100, it is not necessary for the release mechanism as shown in FIGS. 1 and 2 to be actuated in order to be able to rotate the wiper blade-side fastening part 20 relative to the fastening element 50 about the axis of rotation without the first engagement element 51 abutting on an upper surface of the fastening element 50. In particular, the first securing element 51 of the fastening element 50 shown in FIG. 3C makes contact, during the installation process, with the flattened side surface and is guided. In typical embodiments, the elastic element 25, when the lower end of the side surface is reached, moves the release mechanism 60 into the engaging position. In some embodiments, it is thus the case that, during the installation process, the release mechanism 60 automatically opens counter to the elastic element 25, for example counter to a spring force, and, in the state of engagement with detent action, an undercut is formed, and the wiper blade is held in the working position.

Even though it is the case in the embodiments shown in FIGS. 1 to 3 that the second engagement element 22 is in the form of a projection and the second securing element 52 is in the form of a depression, the present disclosure is not restricted thereto. In particular, the second engagement element 22 may also be in the form of a depression, and the second securing element 52 may be in the form of a projection. In embodiments of the disclosure that may be combined with other embodiments, the first and/or the second securing element 51, 52 may be formed at other positions of the fastening element 50 and/or with a different shape.

Figure 4:
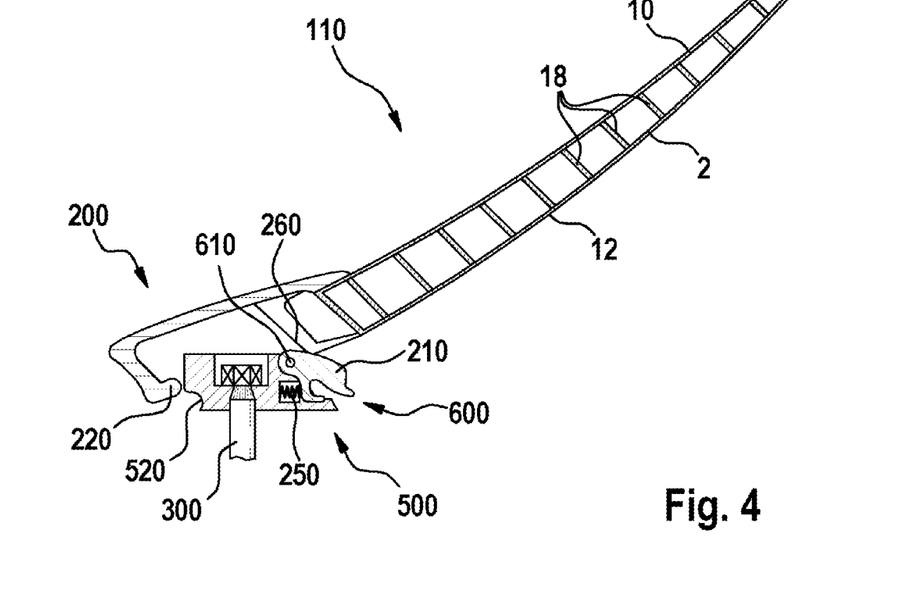
FIG. 4 is a schematic illustration of a windshield wiper device according to other embodiments of the disclosure in an unfastened state.
Figure 5:
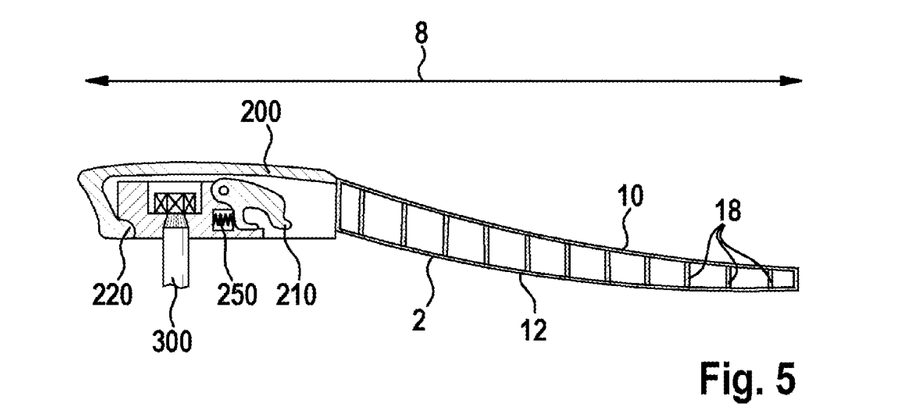
FIG. 5 is a schematic illustration of the windshield wiper device as per FIG. 4 in a fastened state.

FIGS. 4 to 7 schematically illustrate a windshield wiper device 110 according to other embodiments of the disclosure. FIG. 4 shows the windshield wiper device 110 in an unfastened state, and FIG. 5 shows the windshield wiper device 110 in a fastened state. The windshield wiper device 110 is similar to the windshield wiper device 100 described with reference to FIGS. 1 to 3, wherein, in the case of the windshield wiper device 110, the release mechanism 600 is arranged on the fastening element 500. FIGS. 6A and 6B show perspective views of the wiper blade-side fastening part 200. FIG. 7A shows a perspective view of the fastening element 500 with the release mechanism 600. FIG. 7B shows a perspective view of the release mechanism 600.

In embodiments of the disclosure, the windshield wiper device comprises a fastening element, which can be installed on the vehicle, a fin-ray structure, a wiper blade-side fastening part, and a release mechanism. This will be discussed in more detail in FIGS. 9A and 9B.

In embodiments of the disclosure, the windshield wiper device 110 comprises a fastening element 500, which can be installed on the vehicle, and a wiper blade 2. The wiper blade 2 comprises an elongate upper part 10 and an elongate lower part 12, which are at least partially of flexible form. Furthermore, multiple connecting elements 18 for connecting the upper part 10 and the lower part 12 are provided, wherein the connecting elements 18 are spaced apart from one another along a longitudinal extent 8 of the windshield wiper device 100. The connecting elements 18 are designed to permit a movement of the upper part 10 and of the lower part 12 relative to one another with a movement component along a longitudinal extent 8 of the windshield wiper device 110.

In embodiments that may be combined with other embodiments, the wiper blade 2 has a wiper blade-side fastening part 200, which is connectable to the fastening element 500. The wiper blade-side fastening part 200 and the fastening element 500 are configured such that, by way of a rotation of the wiper blade-side fastening part 200 relative to the fastening element 500, an engagement action can be realized in order to connect the wiper blade-side fastening part 200 to the fastening element 500. The connection can be released by way of a release mechanism 600.

In embodiments that may be combined with other embodiments, the wiper blade-side fastening part 200 and the fastening element 500 are configured such that, by rotation of the wiper blade-side fastening part 200 relative to the fastening element 500 about an axis of rotation which runs substantially transversely with respect to the longitudinal extent 8 of the windshield wiper device 110, a position of the wiper blade-side fastening part 200 relative to the fastening element 500 can be fixed.

In embodiments that may be combined with other embodiments, for the installation of the windshield wiper device 110, the latter is pressed against a windshield of the vehicle by way of a rotational movement about the axis of rotation, and engages with detent action in the working point. This may be realized either by way of a force (for example using a finger) or else, for relatively strong preloads, by way of an installation moment (for example using a hand). In the event of uninstallation, the release mechanism (for example pushbutton) is actuated, and the part (wiper blade) is separated from the drive (fastening element) by way of a slight rotational movement.

In embodiments of the disclosure that may be combined with other embodiments, for the installation of the wiper blade 2 on the fastening element 500 by way of a rotation of the wiper blade-side fastening part 200 relative to the fastening element 500, an engagement action is realized between the wiper blade-side fastening part 200 and the fastening element 500 in order to connect the wiper blade-side fastening part 200 to the fastening element 500. For uninstallation, the release mechanism 600 is actuated, whereby the connection between the wiper blade-side fastening part 200 and the fastening element 500 is released, such that the wiper blade-side fastening part 200 can be released from the fastening element 500 by way of a rotation of the wiper blade-side fastening part 200 relative to the fastening element 500 in the opposite direction to the rotation during installation.

Thus, by way of the embodiments described herein, a windshield wiper device is provided which can be installed and uninstalled in a simple manner. Accordingly, the windshield wiper device can be easily exchanged in the event of damage, or can be easily removed before traveling through a car washing installation and subsequently installed again. Furthermore, jamming of the elements to be joined, such as may arise for example in the case of axially parallel installation or joining, can be avoided.

In embodiments of the disclosure that may be combined with other embodiments described herein, the release mechanism 60 is arranged on the fastening element 500. Thus, the wiper blade can be produced easily and inexpensively.

In embodiments of the disclosure that may be combined with other embodiments, the release mechanism 600 is in the form of a mechanically actuable pushbutton. In embodiments, the release mechanism 600 may be actuated by way of a pressing action.

As illustrated by way of example in FIGS. 4 and 5, in embodiments of the windshield wiper device 110 that may be combined with other embodiments, the fastening element 500 may have a first engagement element 210. In typical embodiments, the first engagement element 210 is connected to the release mechanism 600. Typically, the first engagement element 210 is designed to realize an engagement action with a first securing element 290 (FIG. 6A) of the wiper blade-side fastening part 200.

Figure 6A:
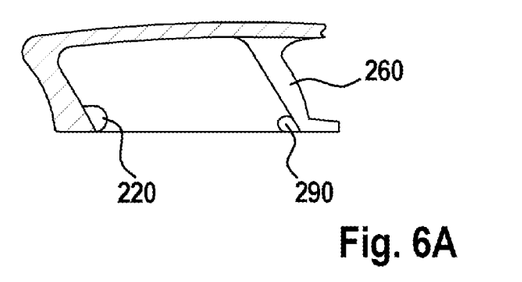
FIGS. 6A and 6B show two perspective views of the wiper blade-side fastening part of the windshield wiper device of FIGS. 4 and 5 according to embodiments of the disclosure.

In embodiments described herein, the first engagement element 210 can realize an engagement action with the first securing element 290 by way of a rotation about the axis of rotation which runs substantially transversely with respect to the longitudinal extent 8 of the windshield wiper device 110. In some embodiments, the first securing element 290 is formed from an edge region, a projection or a depression of the wiper blade-side fastening part 200. In FIG. 6A, the first securing element 290 is in the form of a projection.

In embodiments of the disclosure that may be combined with other embodiments described herein, the first engagement element 210 is designed such that, upon the actuation of the release mechanism 600, the engagement action between the first engagement element 210 and the first securing element 290 is released. It is thus possible for a user to easily install and uninstall the windshield wiper device 110, for example by pressing the release mechanism 600. In some embodiments, the first engagement element 210 is connected to the release mechanism 600. In some further embodiments, the first engagement element 210 and the release mechanism 600 are formed in one piece.

In embodiments of the disclosure that may be combined with other embodiments described herein, the release mechanism 600 comprises an elastic element 250. In this way, the release mechanism 600 can be fixed in a predetermined position, for example by way of a stress imparted by the elastic element 250. In some embodiments, the predetermined position is a position in which, in the installed state, the first engagement element 210, which is connected to the release mechanism 600, is in engagement with the first securing element 290. In this way, an inadvertent release of the connection can be prevented. An actuation of the release mechanism 600 may in this case be performed counter to the elastic element 250, for example counter to the stress imparted by the elastic element 250. In embodiments of the disclosure that may be combined with other embodiments described herein, the elastic element 250 comprises a spring or an elastic material.

In embodiments of the disclosure that may be combined with other embodiments described herein, the release mechanism 600 is mounted so as to be rotatable about an axis 610 which is substantially perpendicular to the longitudinal direction 8.

In embodiments of the disclosure that may be combined with other embodiments described herein, the release mechanism 600 and the first engagement element 210 are formed in one piece.

Figure 7A:
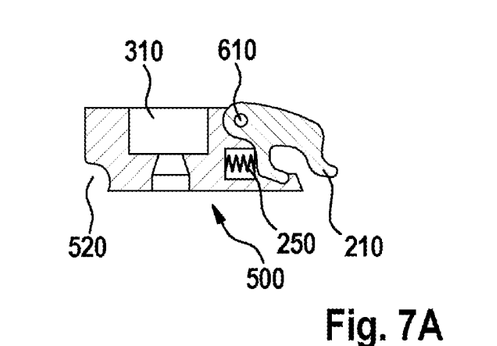
FIG. 7A shows a perspective view of the fastening element with the release mechanism of the windshield wiper device of FIGS. 4 and 5 according to embodiments of the disclosure.
Figure 7B:
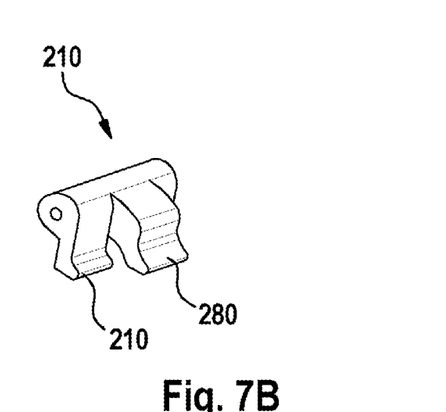
FIG. 7B shows a perspective view of the release mechanism of the windshield wiper device of FIGS. 4 and 5 according to embodiments of the disclosure.

In typical embodiments, the release mechanism 600 comprises an actuation part 280 and the first engagement element 210, as shown in FIGS. 7A and 7B. Here, in typical embodiments, the first engagement element 210 may be of two-part form, wherein the parts are provided for example so as to flank the actuation part 280. In typical embodiments, in the wiper blade-side fastening part 200, the first securing element 290 may be of two-part form, such that the parts of the first securing element 210 are formed at positions which correspond to the parts of the engagement element 210.

Figure 6B:
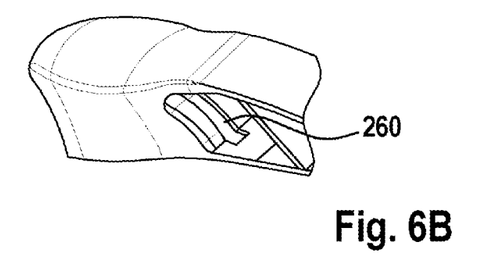

In embodiments of the disclosure that may be combined with other embodiments described herein, the wiper blade-side fastening part 200 has a cutout 260 through which the release mechanism 600 can be actuated. In typical embodiments, the above-described actuation part 280 of the release mechanism projects through the cutout (window) 280 such that it can be actuated by a user.

In embodiments of the disclosure that may be combined with other embodiments described herein, the wiper blade-side fastening part 200 has a depression which is designed to at least partially receive the fastening element 500 and/or the release mechanism 600. In typical embodiments, the release mechanism 600 can be actuated through the window 260 in the wiper blade-side fastening part 200. Here, in typical embodiments, the actuation part 280 may project through the cutout 260 such that it can be actuated by a user.

In embodiments of the disclosure that may be combined with other embodiments described herein, the fastening element 500 and the release mechanism 600 may, in the installed state, be at least partially covered or surrounded by the wiper blade-side fastening part 200. The release mechanism 600 can typically be actuated through the window 260 in the wiper blade-side fastening part 200. Here, in typical embodiments, the actuation part 280 may project through the cutout 260 such that it can be actuated by a user.

In embodiments of the windshield wiper device 110 that may be combined with other embodiments, the wiper blade-side fastening part 200 may have a second engagement element 220. The second engagement element 220 is typically designed to realize an engagement action with a second securing element 520 of the fastening element 500. In embodiments described herein, an engagement action may be realized by way of a linear movement of the second engagement element 220 of the wiper blade-side fastening part 200 relative to the second securing element 520 of the fastening element 500. Typically, the end position of the second engagement element 220, that is to say the position in which the second engagement element 220 forms a stop in the second securing element 520, defines the position of the axis of rotation about which the wiper blade-side fastening part 200 is rotated relative to the fastening element 500 during an installation or uninstallation process.

In embodiments of the windshield wiper device that may be combined with other embodiments, the second engagement element 220 may be configured so as to extend substantially transversely with respect to the longitudinal extent 8 of the windshield wiper device 110. The second engagement element 220 of the windshield wiper device 110 preferably extends at an angle of approximately 90° relative to the longitudinal extent 8. The second engagement element 220 may be of pin-shaped form. It is thus possible, with the embodiments described herein, to provide a particularly effective and stable fastening device for a windshield wiper device.

In embodiments of the windshield wiper device that may be combined with other embodiments, the second engagement element 220 may comprise a plastic or be composed of plastic. In embodiments of the windshield wiper device that may be combined with other embodiments, the second securing element 520 may comprise aluminum, zinc, a plastic, a plastic with metal insert or a combination thereof.

Even though it is the case in the embodiments shown in FIGS. 4 to 7 that the second engagement element 220 is in the form of a projection and the second securing element 520 is in the form of a depression, the present disclosure is not restricted thereto. In particular, the second engagement element 220 may also be in the form of a depression, and the second securing element 520 may be in the form of a projection.

In embodiments of the windshield wiper device that may be combined with other embodiments, the fastening element 500 has a receiving part for a drive shaft 300, as shown by way of example in FIGS. 4, 5 and 7A.

Figure 8:
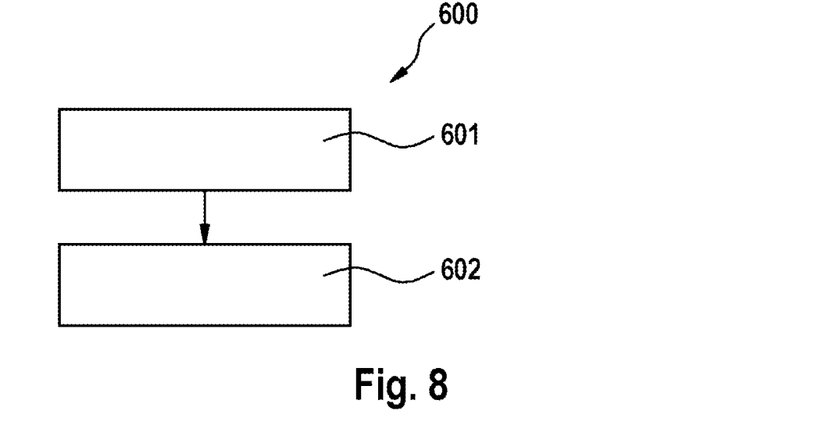
FIG. 8 shows a flow diagram illustrating embodiments of the method for the installation of a windshield wiper device according to embodiments of the disclosure.

For illustration of embodiments of the method 600 for the installation of a windshield wiper device, a flow diagram is illustrated in FIG. 8. In embodiments of the method 600, the method 600 comprises providing 601 a windshield wiper device as per the embodiments described herein. Furthermore, the method comprises connecting 602 the wiper blade-side fastening part to the fastening element by realization of an engagement action between the wiper blade-side fastening part and the fastening element, and rotation of the wiper blade-side fastening part relative to the fastening element about an axis of rotation. The connection can be released again by way of the release mechanism.

Thus, by way of the embodiments described herein of the windshield wiper device, and by way of the method for installation of the windshield wiper device, a windshield wiper device is provided which can be installed and uninstalled in a simple manner. Accordingly, the windshield wiper device can be easily exchanged in the event of damage, or can be easily removed before travelling through a car washing installation and subsequently installed again.

Figure 9A:
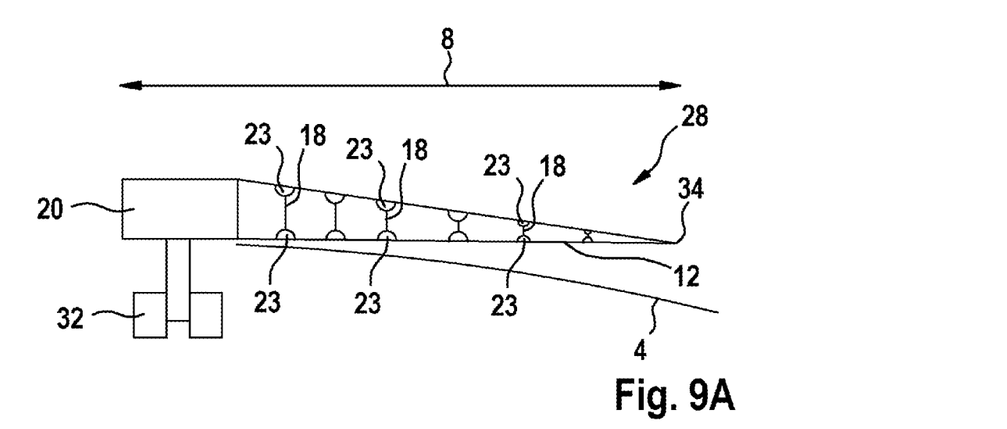
FIG. 9A is a schematic illustration of an exemplary embodiment of a windshield wiper device according to the invention in the form of a wiper blade in a basic position.

The fastening as per the embodiments described herein may be advantageously used in particular for a fin-ray wiper. This will be described in more detail in FIGS. 9A and 9B. FIG. 9A is a schematic illustration of an exemplary embodiment of the windshield wiper device in the basic position. Here, the windshield wiper device is a wiper arm with an integrated wiper blade 28, which is attached to a fastening part 20 or to an attachment piece. The fastening part 20 or a corresponding fastening element may be designed in accordance with the embodiments described here. The fastening part 20 is connected by way of a vehicle-side fastening element to a wiper motor 32, which drives the fastening part 20 for the purposes of wiping the windshield 4. The wiper blade 28 is of wedge-shaped design, wherein one end of the upper part 10 is fixedly connected, at an outer connecting position 34, to one end of the lower part 12. The respective other end of the upper part 10 and of the lower part 12 are fastened to the fastening part 20.

Figure 9B:
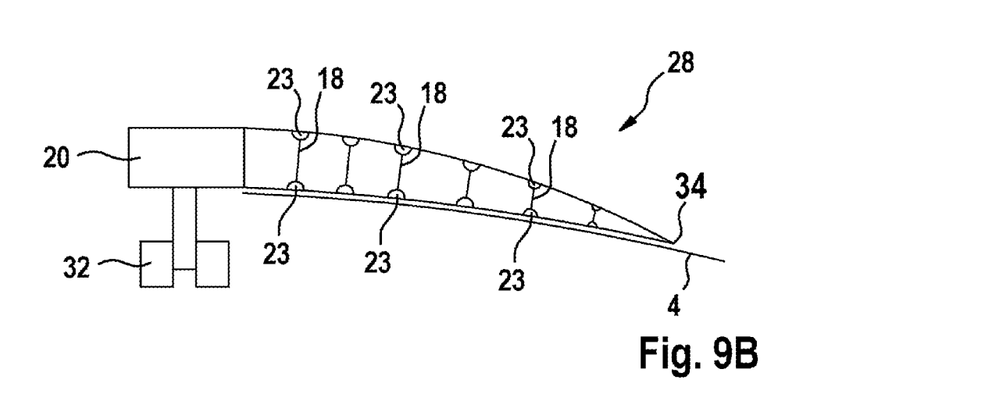
FIG. 9B is a schematic illustration of the wiper blade as per FIG. 9A in a position placed against a windshield.

FIG. 2B is a schematic illustration of the wiper blade 28 with integrated wiper arm 30 as per FIG. 2A in a position placed against the windshield 4. In this case, too, pressure forces act on the lower part 12 of the wiper blade 28 from below from the direction of the windshield 4, such that the lower part 12 and the upper part 10 bend in the direction of the windshield 4.

FIG. 2A illustrates the wiper blade in its position in which it is not placed against the windshield, such that the lower part 12 is of substantially straight form. In yet further embodiments that may be combined with other embodiments, the lower part is, in the unloaded state, of convex form, that is to say with a curvature which projects away from the upper part in a central region. Upon coming into contact with a windshield, proceeding from the convex shape of the lower part, the windshield wiper device according to the embodiments described here may typically then assume the corresponding concave shape, which adapts to the windshield, of the lower part.

Both the upper part 10 and the lower part 12 are, or may be designed as, flexible beams which, in FIGS. 9A and 9B, are for example in each case of unipartite form. This makes it possible to realize a particularly stable construction. It is likewise possible for only in each case one part of the upper part 10 and/or of the lower part 12 to be designed to be flexible. In some embodiments that may be combined with the other embodiments described here, for the upper part 10 and/or the lower part 12, a material is used which has a modulus of elasticity which lies in a range between 0.005 kN/mm$^2$ and 0.5 kN/mm$^2$, in particular 0.01 kN/mm$^2$ and 0.1 kN/mm$^2$. This makes it possible to realize suitable flexibility of the upper part 10 and of the lower part 12. Together with a suitably designed cross-sectional area of the upper part 10 and of the lower part 12, optimum flexural stiffness is thus realized. The upper part 10 and the lower part 12 are arranged so as to be situated opposite one another. The end of the upper part 10 is fixedly connected, at the outer connecting position 34, to the end of the lower part 12. Otherwise, the upper part 10 and the lower part 12 are spaced apart from one another.

The upper part 10 and the lower part 12 are connected to one another by way of connecting elements 18. In particular in the basic position of the wiper blade 2, said connecting elements run, in FIG. 9A, approximately transversely with respect to the longitudinal extent 8 of the wiper blade 2. In further embodiments that may be combined with the embodiments described here, said connecting elements may also run at an angle of greater than 90° or less than 90°, in particular at mutually different angles. The connecting elements 18 are fastened by way of rotary joints 20 to inner longitudinal sides, which face toward one another, of the upper part 10 and of the lower part 12. Here, the rotary joints 20 are hinges which can be made available by way of a plugging or clipping action. Alternatively, the hinges may also be formed by film hinges.

The connecting elements 18 are spaced apart from one another along the longitudinal extent of the wiper blade 2. The spacings between in each case two adjacent connecting elements 18 are equal. Said spacings may however also be selected so as to differ. The spacings are advantageously less than 50 mm, in particular less than 30 mm. In the present exemplary embodiment, one spacing 22 is illustrated as a representative of the spacings between in each case two connecting elements 18. The connecting elements 18 are, in particular in the basic position of the wiper blade 2, fastened to the lower part 12 such that their longitudinal axes run at angles 26 of between 45° and 135°, with the angles lying in particular between 65° and 115°, with respect to the lower part 12. For example, said angles may vary in subregions along the longitudinal extent, that is to say may increase or decrease from one connecting element to the next connecting element. A corresponding situation applies in the present exemplary embodiment to the fastenings of the connecting elements 18 to the upper part 10.

The spacings between the upper part 10 and the lower part 12 are defined primarily by the lengths of the connecting elements 18. The lengths of the connecting elements 18 increase in size proceeding from the outer connecting position 34 as far as approximately the locations at which the bracket 6 that is attached to the upper part 10 begins. In this way, in the side view of the wiper blade 2 as per FIG. 9A, the upper part 10 and lower part 12 form a wedge. The connecting elements may be designed to be resistant to buckling or may be elastic.

FIG. 9B is a schematic illustration of the wiper blade 2 as per FIG. 9A in a position placed against the windshield 4. Since the windshield 4 has a curvature, it is the case that, when the wiper blade 2 bears against the windshield 4, contact pressure forces act on the lower part 12. Since the upper part 10 and the lower part 12 are flexible beams and the connecting elements 18 are mounted rotatably on upper part 10 and lower part 12, the upper part 10 and the lower part 12 are displaceable relative to one another. Owing to the pressure forces that act on the lower part 12 from below, the wiper blade 2 bends in the direction from which the pressure forces originate, and bears exactly against the curvature of the windshield 4.

Owing to the construction of the embodiments described here, it is the case that, when a force is exerted on the lower part (by the windshield 4), the lower part bends in the direction from which the force acts. This is realized by way of the connection of the upper part 10 and of the lower part at a connecting position 34, the shape, and by way of rotary joints at the connection between the connecting elements and the upper part and lower part.

In the illustration as per FIG. 9B, there is a small spacing between the wiper blade 2 and the windshield 4, which spacing serves here merely for the illustration of the windshield 4 and of the wiper blade 2 and, in reality, substantially does not exist when the wiper blade 2 bears against the windshield 4. Furthermore, in the case of most wiper blades, a rubber lip is situated on the lower side, averted from the upper part 10, of the lower part 12, which rubber lip (not illustrated for the sake of clarity) is set down on the windshield 4 for wiping purposes.

A windshield wiper device of this kind, for example a windshield wiper arm or a windshield wiper arm with windshield wiper blade, has the advantage of improved adaptation to a windshield of a motor vehicle. In the case of a conventional windshield wiper blade, the upper part thereof is conventionally rigid, that is to say is not designed to be flexible.

A windshield wiper device according to embodiments described here utilizes the effect of tailfins of certain fish species, which, under the action of lateral pressure, do not deflect in the direction of the pressure but curve in the opposite direction, that is to say in the direction from which the pressure originates. This principle is also referred to as the "fin-ray" principle.

What is claimed is:

1. A windshield wiper device (110) for a vehicle, the device comprising
 a wiper blade having
  an elongate upper part (10) which is at least partially of flexible form,
  an elongate lower part (12) which is at least partially of flexible form,
  multiple connecting elements (18) connecting the upper part (10) and the lower part (12), wherein the connecting elements (18) are spaced apart from one another along a longitudinal extent (8) of the wiper blade (2), and wherein the connecting elements (18) are configured to permit a movement of the upper part (10) and of the lower part relative to one another with a movement component along the longitudinal extent (8) of the wiper blade (2), and
  a wiper blade-side fastening part (200) having a first securing element (290) and a second engagement element (220), wherein the second engagement element (220) is disposed at a first end of the wiper blade and protrudes along the longitudinal extent (8) toward a second end of the wiper blade; and
 a fastening element (500) configured to be fastened to the vehicle, wherein the fastening element (500) includes a first engagement element (210) and a second securing element (520), wherein the second securing element (520) is a recess disposed along an end of the fastening element (500) and is sized and shaped to receive the second engagement element (220), wherein the fastening element (500) includes a main body having an opening configured to receive a drive shaft (300), and a release mechanism (600) pivotally coupled to the main body;
 wherein the wiper blade-side fastening part (200) is configured such that, by inserting the second engagement element (220) into the second securing element (520) and rotating the wiper blade-side fastening part (200) relative to the fastening element (500), an engagement action is realized between the first securing element (290) and the first engagement element (210) in order to connect the wiper blade-side fastening part (200) to the fastening element (500), and wherein the connection is configured to be released by way of the release mechanism (600); wherein the wiper blade-side fastening part (200) comprises a top wall and an interior wall that together define a cavity sized to receive the fastening element, wherein the wiper blade-side fastening part (200) further includes a cutout (260)

within the interior wall that is concealed below the top wall and through which the release mechanism (600) is configured to be actuated, wherein the release mechanism includes an actuation part (280) in the form of a projecting central tongue that is configured to extend into the cutout in the interior wall of the wiper blade-side fastening part (200), and wherein the first engagement element (210) is in two-part form and flanks the actuation part (280).

2. The windshield wiper device (110) as claimed in claim 1, wherein the release mechanism (600) comprises a mechanically actuable pushbutton.

3. The windshield wiper device (110) as claimed in claim 1, wherein the second engagement element (220) extends substantially transversely with respect to the longitudinal extent (8) of the wiper blade (2) and is of pin-like form in order to permit a rotation of the wiper blade-side fastening part (200) relative to the fastening element (500).

4. The windshield wiper device (110) as claimed in claim 1, wherein the first engagement element (210) is disposed on a first side of the fastening element (500) and the second securing element (520) is disposed on a second, opposite side of the fastening element (500), wherein the first and second sides are spaced apart from one another along the longitudinal extent.

5. The windshield wiper device (110) as claimed in claim 4, further comprising an elastic element (250) coupled to the release mechanism (600), such that the release mechanism is biased in one direction relative to the fastening element (500).

6. The windshield wiper device as claimed in claim 1, wherein the entire release mechanism (600) is rotatable about an axis that is substantially perpendicular to the longitudinal extent (8).

7. The windshield wiper device as claimed in claim 6, further comprising a spring (250) coupled to the release mechanism (600), wherein the spring is configured to bias the release mechanism (600) in a rotational direction about the axis.

8. The windshield wiper device as claimed in claim 7, wherein the spring (250) extends between a portion of the main body of the fastening element (500) and a portion of the release mechanism (600).

9. The windshield wiper device as claimed in claim 8, wherein the spring (250) is configured to bias and rotate an actuation part (280) of the release mechanism (600) through a cutout (260) in the wiper blade-side fastening part (200).

10. A windshield wiper device (110) for a vehicle, the device comprising
a wiper blade having
an elongate upper part (10) which is at least partially of flexible form,
an elongate lower part (12) which is at least partially of flexible form,
multiple connecting elements (18) connecting the upper part (10) and the lower part (12), wherein the connecting elements (18) are spaced apart from one another along a longitudinal extent (8) of the wiper blade (2), and wherein the connecting elements (18) are configured to permit a movement of the upper part (10) and of the lower part relative to one another with a movement component along the longitudinal extent (8) of the wiper blade (2), and
a wiper blade-side fastening part (200) having a first securing element (290) and a second engagement element (220), wherein the second engagement element (220) is disposed at a first end of the wiper blade and protrudes along the longitudinal extent (8) toward a second end of the wiper blade; and
a fastening element (500) configured to be fastened to the vehicle, wherein the fastening element (500) includes a first engagement element (210) and a second securing element (520), wherein the second securing element (520) is a recess disposed along an end of the fastening element (500) and is sized and shaped to receive the second engagement element (220), wherein the fastening element (500) includes a main body having an opening configured to receive a drive shaft (300), and a release mechanism (600) pivotally coupled to the main body;
wherein the wiper blade-side fastening part (200) is configured such that, by inserting the second engagement element (220) into the second securing element (520) and rotating the wiper blade-side fastening part (200) relative to the fastening element (500), an engagement action is realized between the first securing element (290) and the first engagement element (210) in order to connect the wiper blade-side fastening part (200) to the fastening element (500), and wherein the connection is configured to be released by way of the release mechanism (600)
wherein the entire release mechanism (600) is rotatable about an axis that is substantially perpendicular to the longitudinal extent (8), wherein the windshield wiper device includes a spring (250) coupled to the release mechanism (600), wherein the spring is configured to bias the release mechanism (600) in a rotational direction about the axis, wherein the spring (250) extends between a portion of the main body of the fastening element (500) and a portion of the release mechanism (600), wherein the spring (250) is configured to bias and rotate an actuation part (280) of the release mechanism (600) through a cutout (260) in the wiper blade-side fastening part (200), wherein the first engagement element (210) is in two-part form and flanks the actuation part (280).

11. The windshield wiper device as claimed in claim 1, further comprising the drive shaft (300) of the vehicle, wherein the drive shaft is disposed within the opening of the main body of the fastening element (500).

* * * * *